Dec. 4, 1962

R. H. CARPENTER 3,066,564

HOSE CUT-OFF MACHINE

Filed March 19, 1959

INVENTOR.
ROBERT H. CARPENTER

BY
RICHEY, McNENNY & FARRINGTON

Donald W. Farrington
ATTORNEYS

INVENTOR.
ROBERT H. CARPENTER
BY
RICHEY, McNENNY & FARRINGTON
Donald W. Farrington
ATTORNEYS Dec. 4, 1962  R. H. CARPENTER  3,066,564
HOSE CUT-OFF MACHINE Filed March 19, 1959  3 Sheets-Sheet 3

INVENTOR.
ROBERT H. CARPENTER
BY
RICHEY, McNENNY & FARRINGTON
Donald W. Farrington
ATTORNEYS

United States Patent Office 3,066,564
Patented Dec. 4, 1962

3,066,564
HOSE CUT-OFF MACHINE
Robert H. Carpenter, Fort Wayne, Ind., assignor to The Weatherhead Company, Cleveland, Ohio, a corporation of Ohio
Filed Mar. 19, 1959, Ser. No. 800,474
14 Claims. (Cl. 83—175)

This invention relates generally to apparatus for severing lengths of elongated material and is particularly useful for severing lengths of relatively soft flexible articles which articles are wholly or partially formed of flexible plastic materials, such as synthetic or natural rubber, or rubber-like materials and various elastomers such as plasticized polyvinyl chloride or the like, it being intended that such materials be generally described herein as being "plastic" materials. The apparatus of this invention is particularly adapted for the cutting of flexible hose made of materials such as those referred to above, which may also include internal or external reinforcements.

Such hoses are manufactured in long lengths and must be cut to shorter lengths for application to various fittings, hose ends or the like for the job at hand. Many of such hoses are constructed to strongly resist fluid pressure and hence, as mentioned above, often incorporate body or carcass structure in the form of braided or woven cords, which cords may be either of textile material or of metal wire.

In many fittings it is important that the hose be cut to provide a square end in order that the proper joint may be made with the fitting or hose end. It is important that the hose does not creep lengthwise during the cut nor should it rotate during the cut because either of these actions results in an irregularly shaped cut end.

Usually, articles of the type to be severed by the apparatus of the invention are somewhat deformable and, therefore, if they are firmly clamped, as with a vise, they will be flattened to such extent that after the cut is made and they spring back to their normal shape, the ends of the cut will not be square and uniform. Difficulties have also been encountered with the material crowding against the knife during the cutting operation causing burning of the material and a ragged cut edge.

It is a feature of this invention that relatively resilient materials, insofar as maintaining their shape under clamping pressure is concerned, can be readily cut to produce true, clean and square edges without encountering the above-mentioned difficulties. Briefly, this is accomplished by flexing the material while gripping it at points remote from the zone of cut. This flexing is arranged to bow or bend the material so that it presents a convex contour to the rotating cutting blade or knife. This arrangement tensions the material at the zone being cut and takes advantage of the known phenomenon that many materials, in particular, rubber-like materials cut most easily and cleanly when under tension. Yet, this tension is applied without distorting the cross sectional shape of the hose or the like.

In the preferred form of the invention, a carriage is provided that can be moved toward and away from a rotary knife. There is a material support foot that straddles the knife and is mounted on the carriage. At each side of the foot is an adjustable material engaging jaw which is arranged to apply a cantilever force to the material at each side of the jaw, thereby flexing or bowing it to present a convex contour to the knife. This condition of material is maintained as the carriage is advanced to bring the hose against the cutting knife. Since the uncut material at the knife is always under tension this facilitates a clean cut whether the material be rubber, rubber covered with woven or braided fabric, or other flexible materials. The jaws are adjustable in the preferred form of the invention to provide the just right amount of bowing of the material for knife cutting without unduly distorting the material.

In the preferred form of the invention, this bowing action is automatic in the sense that the jaws are connected to the operating handle and the degree to which they bow or flex the material depends upon the force exerted upon the handle which in turn depends upon the resistance encountered during the cutting operation. Since, as has been mentioned, when the material has been flexed under tension, the cutting is facilitated, this automatic action simplifies the cutting of materials that are tough or difficult to cut, without requiring special skills on the part of the operator. This automatic bowing action also improves the grip on the material to provide additional resistance to dislodgement thereof that might be encountered because of difficulties in cutting tough material.

The manner with which these advantages and features may be obtained will be apparent to one skilled in the art from the following detailed description of a preferred embodiment of the invention.

Figure 1:
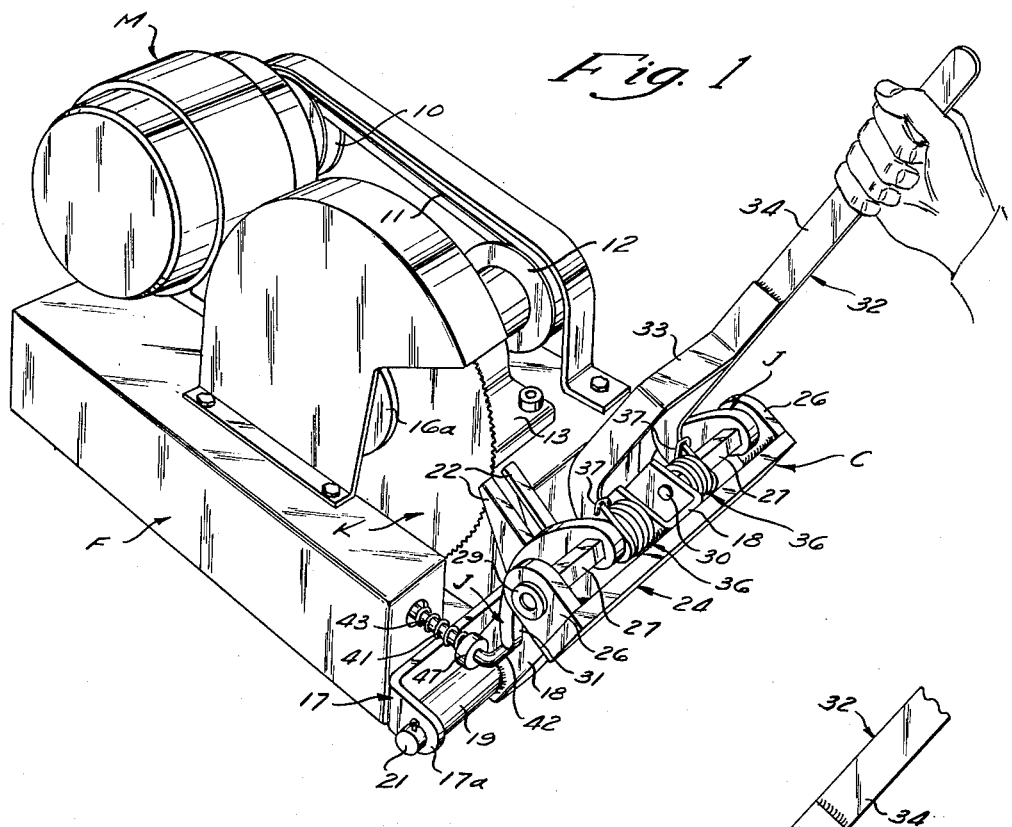
FIG. 1 is a perspective view of an apparatus embodying the invention, there being no hose shown gripped in the jaws for clarity of illustration.
Figure 3:
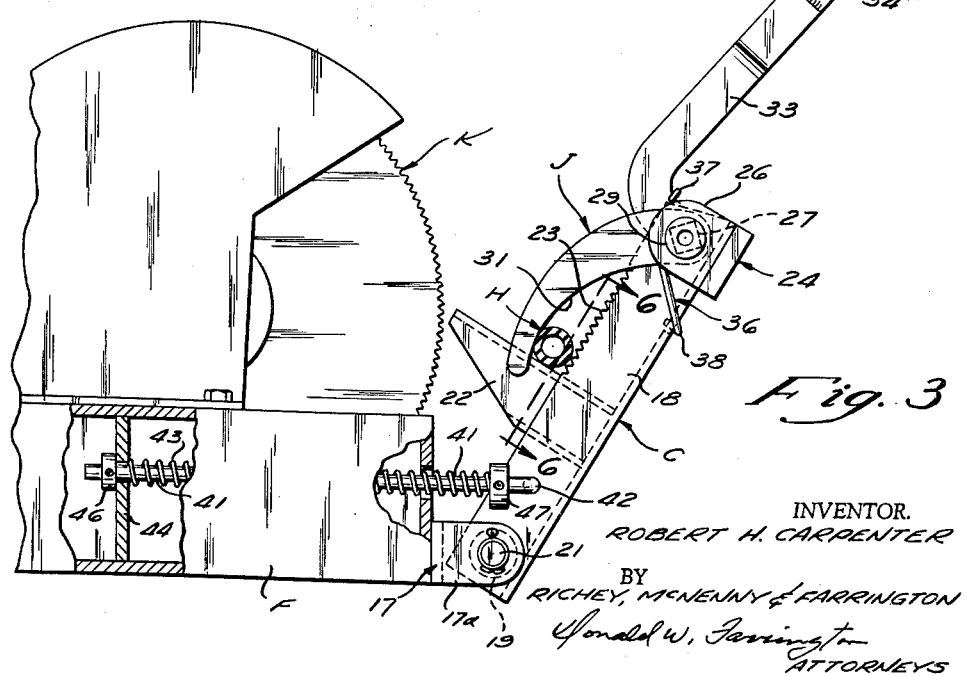
FIG. 3 is a partial side view of the apparatus in its retracted condition.
Figure 2:
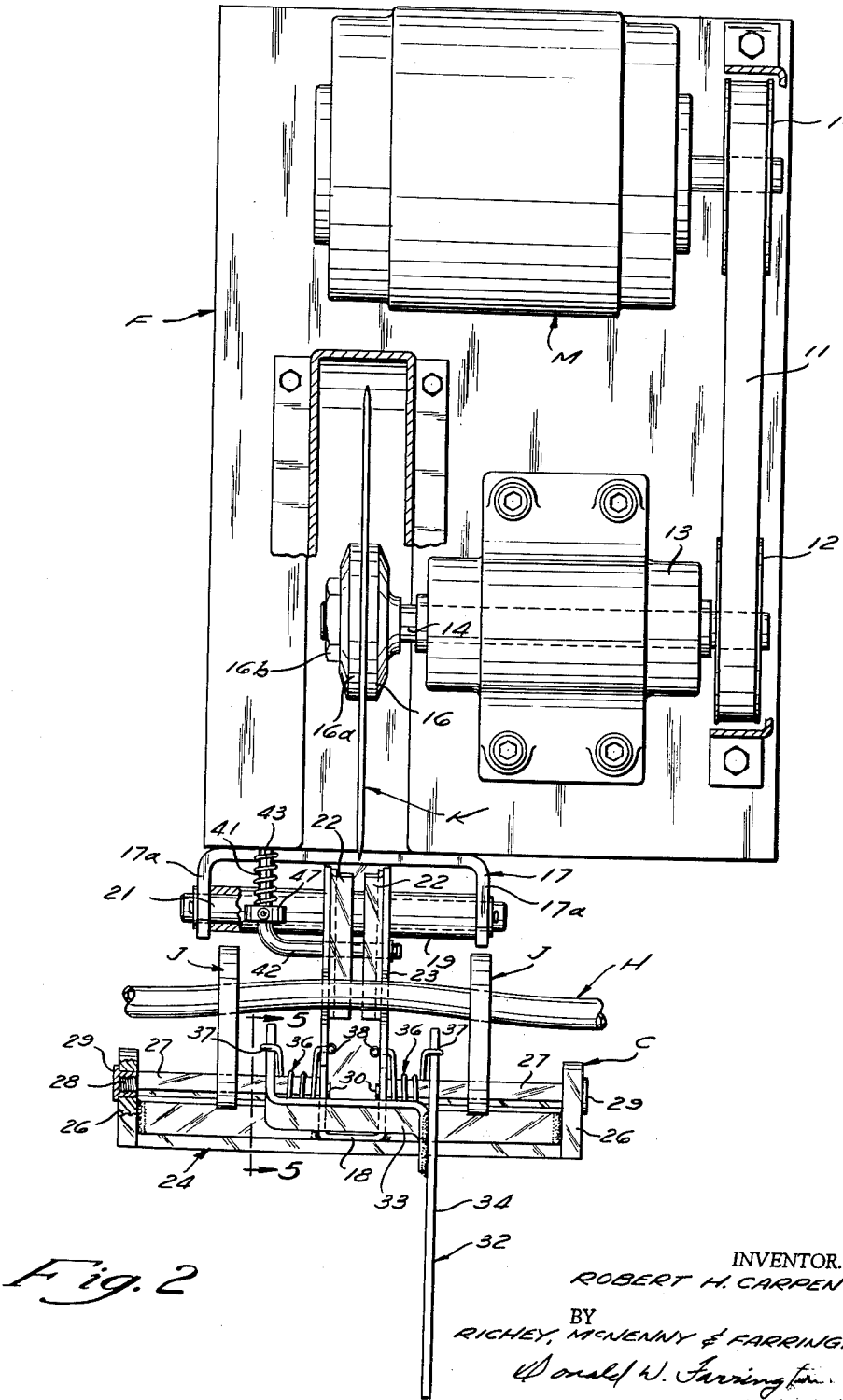
FIG. 2 is the plan view of the apparatus showing a hose gripped in the jaws, but with the carriage retracted.

Referring to FIGS. 1–3, the apparatus includes a frame F mounting a motor M that drives a rotary knife K. The drive illustrated is by means of a motor pulley 10, a V belt 11, and a knife pulley 12. Mounted on the frame is a bearing or pillow block 13 (FIG. 2) for receiving the knife shaft 14. Details of the bearing assembly form no part of the invention and are not shown. The knife base is clamped to shaft 14 by a fixed washer 16, removable washer 16a, and a suitable nut 16b, such mountings being well known in the cutting tool art. On the forward end of the apparatus is the carriage assembly C that receives the hose H to be cut. It should be stated that although the cutting of flexible hose might be a very important use of the apparatus, the invention is not specifically limited to the cutting of hose but can be used to cut other flexible, elongated materials having the characteristic of the hose in that their cross sectional shape can be distorted under external forces such as those that would be engendered by a positive action vise, as well as the pressure of the cutting blade or knife itself.

The carriage pivots on a mounting bracket 17 having spaced ears 17a, and bracket 17 is attached to the frame in any suitable manner. The carriage C includes an upwardly extending channel member 18, the lower end of which is welded to a transverse sleeve 19 that pivotally mounts the channel 18 on the frame by the means of a transverse pin 21 suitably fastened in ears 17a in the bracket 17. Along the mid-portion of the channel is welded a pair of hose rests or feet 22 which extend at right angles to the channel 18. The other supporting surface for the hose H to be cut is provided on channel 18 by rows of teeth 23 formed on the major flange portions of the channel. These teeth prevent rotation of the hose during the cutting operation.

Figure 4:
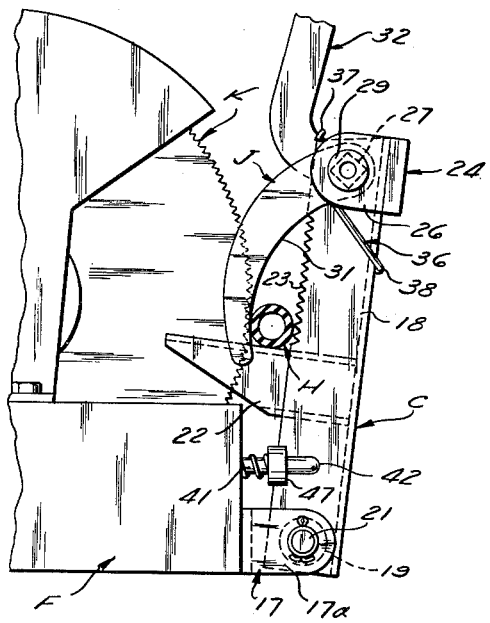
FIG. 4 is a side view of the knife and carriage assembly similar to FIG. 3, but with the carriage in the cutting position about to begin the cut.
Figure 7:
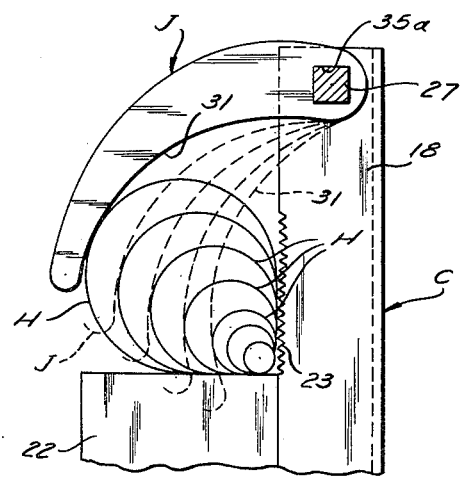
FIG. 7 is a diagram showing how the specially formed carriage jaw members can accommodate a wide range of hose sizes.
Figure 6:
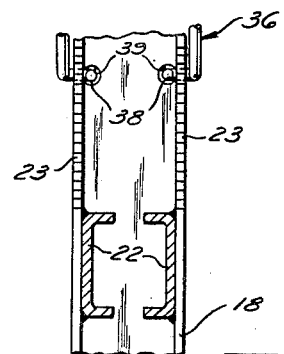
FIG. 6 is a partial section taken on 6—6 of FIG. 3.

In order to support the hose clamping jaws, the outer, or free end of channel 18 is welded to a transversely extending bracket 24 having forwardly extending ears 26 at each end thereof. The movable hose gripping jaws are supported on a pair of square shafts 27, the outer ends thereof being threaded as at 28 (FIG. 2) and retained by a combined bearing and thimble nut 29. The inner ends of the shaft are turned down to provide pins 30 that pivot at suitable apertures in the side flanges of channel 18. There is a pair of jaws J, one for each square shaft 27, which jaws overlie the teeth 23 on the channel 18 as seen in FIGS. 1 and 4. These jaws have a curved face 31 for engaging the hose or material to be cut which arrangement of surfaces accommodates a range of hose sizes as illustrated in the schematic diagram of FIG. 7. For example, a typical apparatus of the proportions shown can be arranged to accommodate hoses from an external diameter of ¼ inch to a hose having an external diameter of 3 inches. In order that the operator can retract the jaws as well as advance the carriage for cutting, a handle 32 is provided which has a bent section 33 and straight section 34 welded thereto. Each of these sections has a squared aperture 35 to key the handle parts to the respective right and left squared shafts 27. The jaws J likewise have squared apertures 35a (FIG. 7) and are each slidably mounted on the squared shafts 27.

Figure 5:
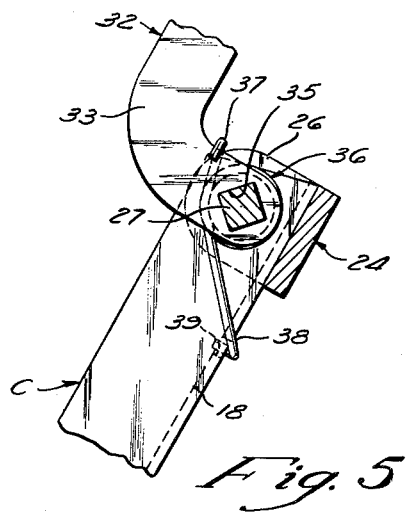
FIG. 5 is a partial section taken on 5—5 of FIG. 2.

In order to provide an initial hose clamping and retaining action, a pair of coil springs 36 is associated with each handle portion, each spring having one hook 37 looped about the respective handle portion, and another hook 38 engaging the channel sidewall, the base of the channel being apertured at 39 (FIG. 5) to receive the hooks 38.

In order to maintain the carriage in a retracted position, so that the hose can be put into and taken out of the carriage jaws, a simple retraction mechanism is provided in the form of a rod 41 having a bent end 42, that is pivoted to channel the body of the rod extending through the frame. A spring 43 surrounds the rod and, as seen in FIG. 3, engages a flange 44 in the frame, there being a stop collar 46 attached to the rod to limit its retraction. There is an outer stop collar 47 that serves as the movable spring seat and also limits the inward motion of the carriage so that the channel 18 cannot accidentally be brought against the rotating knife K.

In operation, the handle 32 is grasped and pulled toward the operator thereby raising the jaws from the channel 18 against the force of springs 36 so that a hose length H may be slipped in place against the feet 22 and the teeth 23 (see FIG. 3) of the channel. If the handle is released, springs 36 bring the movable jaws J against the length of hose extending between the jaws while simultaneously urging such length of hose against channel 18 and feet 22 (see FIG. 3) thereby deflecting or bending the intermediate length of hose somewhat to present a convex contour to the knife, as seen in FIG. 2. The amount of deflection at this stage is determined by the strength of springs 36 and the adjustable position of the jaws J on their respective squared shafts 27. The stiffer the hose, the farther are jaws J placed from the foot members 22. In order to cut the hose, the handle is moved toward the knife thereby swinging the carriage around its mounting shaft and bringing the length of hose disposed between the foot members 22 against the knife. The stiffness or spring rate of the retraction spring 43 augments the flexing force applied to the hose but for most hoses, and particularly small hoses, the spring need not be very stiff. As resistance to cutting is encountered at the knife, this can only be overcome by further application of force to the handle and such application urges the jaws further rearwardly relative to the channel 18 in such a manner to increase the flexing or bending of the intermediate length of hose and thereby increases the tension under which the part of the hose being cut is placed. This greatly facilitates further cutting so that if the apparatus is properly adjusted for the nature of the hose or other length of material being severed, a smooth squared cut is obtained without crowding at the knife or burning of the cut material. The foot and channel arrangement with teeth 23 on the channel, cooperating with the jaws J, retains the hose in position without rotating or other dislodgement thereof during the cutting operation. The hose at the line of cut remains in its normal or free condition, and is not deformed in section by the clamp means, so that a maximum squareness of cut is obtained. Of course, the hose or other material may be dimpled somewhat at the knife blade, at the instant of cutting, but this action does not spoil the cut ends, and is in fact minimized by the fact that the material being cut is under tension, so that it is not only readily cut, but springs slightly away from the knife after it has been cut, eliminating crowding or burning of the material.

In addition to being particularly useful for cutting lengths of hose, extended moulding and the like, I have found that by using a suitable knife I can cut metal tubing such as copper tubing, stainless steel tubing, etc. As the cut proceeds, the same action that flexes the rubber hose or the like, tends to spread the cut edges of the metal tubing, so as to free the tubing from the knife and prevent binding at the knife.

In case the machine is to be employed to cut metal tubing, or if large diameter, stiff rubber hose or the like is to be cut, the spring 43 is constructed to provide a higher spring rate than that most suitable for the conventional range of sizes of typical hoses or the like. This is done in order to augment the resistance to the advance motion of the carriage both before and during cutting, with a corresponding increase in the flexing force applied to the article being cut.

Where it appears in the appended claims, the term "plastic" is used in its broader sense as explained in the introductory remarks.

Having completed a detailed description of the preferred embodiment of the invention so that those skilled in the art may practice the same, I claim:

1. Apparatus for cutting an elongated workpiece comprising a cutter and workpiece holder means mounted for movement of one toward and away from the other, said workpiece holder means including support means for engaging the workpiece in the vicinity where the cut is to be made and at the side thereof away from said cutter, leaving said side of the workpiece unsupported on either side of said support means, said workpiece holder means also including a pair of gripping members substantial distances laterally from said support means on opposite sides of said support means and engageable only against the side of the workpiece facing toward said cutter to hold the workpiece against said support means and to flex the workpiece so that in the vicinity of said support means the workpiece is convex toward said cutter, and said workpiece holder means including manually operable means for positioning said gripping members in gripping engagement with the workpiece independent of said movement between said workpiece holder means and said cutter.

2. The apparatus of claim 1 wherein said manually operable means comprises a handle having a pivotal support on said workpiece holder means and having a free end at the side of its pivotal support away from said workpiece-engaging support means, and said gripping members are coupled to said handle to turn therewith and extend at the opposite side of said pivotal support for engagement with the workpiece, so that movement of said free end of the handle toward the cutter tends to increase the force exerted by said gripping members against the workpiece.

3. The apparatus of claim 2 wherein said workpiece holder means is mounted for movement toward and away from the cutter, and wherein there is provided spring coupling means acting between said workpiece holder means and the handle to bias said gripping members against the workpiece and to spring couple the handle to said workpiece holder means so that movement of said free end of the handle toward the cutter moves said workpiece holder means toward the cutter.

4. The apparatus of claim 2 wherein said gripping members are adjustable laterally with respect to said workpiece-engaging support means to thereby adjust the force which they exert on the workpiece.

5. Apparatus for cutting an elongated workpiece comprising a frame, a cutting knife on the frame, a carriage mounted on said frame for movement toward and away from said knife, workpiece supporting means on said carriage comprising an arm for engaging the side of the workpiece away from the knife and foot means extending from said arm toward the knife and arranged to engage the workpiece from below, workpiece gripping jaws on said carriage positioned to bear only against the side of the workpiece disposed toward the knife, said jaws being disposed one at each side of said foot means on said arm and spaced substantially therefrom, and carriage advancing means connected to said carriage and to said jaws for advancing the carriage toward the knife while simultaneously moving said jaws against the workpiece in a direction to deflect the workpiece at the jaws away from the knife to present a convex length of said workpiece between the jaws to the knife during the cutting operation.

6. Apparatus for cutting an elongated workpiece of plastic material comprising a frame, a cutting knife on the frame, a carriage mounted on said frame for movement toward and away from said knife, workpiece supporting means on said carriage comprising an arm for engaging the side of the workpiece away from the knife and foot means extending from said arm toward the knife and arranged to engage the workpiece from below, said foot means including a pair of workpiece supporting members at opposite sides of the knife, workpiece gripping jaws on said carriage positioned to bear only against the side of the workpiece disposed toward the knife, said jaws being disposed one at each side of said foot means on said arm and spaced substantially therefrom, spring means biasing said jaws in a direction to hold the workpiece resiliently against said workpiece supporting means, and carriage advancing means connected to said carriage and to said jaws for advancing the carriage toward the knife while simultaneously moving said jaws against the workpiece in a direction to deflect the workpiece at the jaws away from the knife to present a convex length of said workpiece between the jaws to the knife during the cutting operation.

7. Apparatus for cutting an elongated workpiece of plastic material comprising a frame, a cutting knife on the frame, a carriage mounted on said frame for movement toward and away from said knife, workpiece supporting means on said carriage comprising an arm for engaging the side of the workpiece away from the knife and foot means extending from said arm toward the knife and arranged to engage the workpiece from below, said foot means being formed to straddle said knife, workpiece gripping jaws, means movably mounting said jaws on said carriage for movement toward and away from only the side of the workpiece supported by said arm and foot means which is disposed toward said knife, said jaws being laterally adjustably disposed one at each side of said foot means on said arm and spaced substantially therefrom, and carriage advancing means connected to the mounting means for said jaws for both advancing the carriage toward the knife and simultaneously moving said jaws against the workpiece in a direction to deflect the workpiece at the jaws away from the knife to present a convex length of said workpiece between the jaws to the knife during the cutting operation.

8. Apparatus for cutting an elongated workpiece of plastic material comprising a frame, a cutting knife on the frame, a carriage mounted on said frame for movement toward and away from said knife, workpiece supporting means on said carriage comprising an arm for engaging the side of the workpiece away from said knife and foot means extending from said arm toward the knife and arranged to engage the workpiece from below, said foot means being formed to straddle said knife, workpiece gripping jaws positioned to bear only against the side of the workpiece which is disposed toward the knife, said jaws being disposed one at each side of said foot means on said arm and spaced substantially therefrom, means pivotally mounting said jaws on said carriage for movement toward and away from said side of the workpiece which is disposed toward the knife, and handle means connected to the pivotal mounting means for said jaws for both advancing the carriage toward the knife and simultaneously moving said jaws against the workpiece to deflect the workpiece at the jaws in a direction away from the knife to present a convex length of the workpiece between the jaws to the knife during the cutting operation.

9. Apparatus for cutting an elongated workpiece of plastic material comprising a frame, a cutting knife on the frame, a carriage mounted on said frame for movement toward and away from said knife, workpiece supporting means on said carriage comprising an arm for engaging the side of the workpiece away from said knife and foot means extending from said arm toward the knife and arranged to engage the workpiece from below, said foot means being formed to straddle said knife, workpiece gripping jaws positioned on said carriage for engagement with only the side of the workpiece which is disposed toward the knife, said jaws having concave workpiece engaging faces for accommodating workpieces of different sections, said jaws being disposed one at each side of said foot means on said arm and spaced substantially therefrom, and carriage advancing means connected to said carriage and to said jaws for advancing the carriage toward the knife while simultaneously moving said jaws against the workpiece in a direction to deflect the workpiece at the jaws away from the knife to present a convex length of said workpiece between the jaws to the knife during the cutting operation.

10. Apparatus for cutting an elongated workpiece of plastic material comprising a frame, a cutting knife on the frame, a carriage mounted on said frame for movement toward and away from said knife, workpiece supporting means on said carriage comprising an arm for engaging the side of the workpiece away from said knife and foot means extending from said arm toward the knife and arranged to engage the workpiece from below, said foot means being formed to straddle said knife, shaft means pivotally mounted on said carriage and extending transversely of said knife, workpiece gripping jaws keyed to but slidably mounted on said shaft means for adjustment toward and away from said workpiece supporting arm and said foot means, said jaws being disposed one at each side of said foot means on said arm and spaced substantially therefrom and being positioned to bear only against the side of the workpeice which is disposed toward the cutting knife, and carriage advancing means connected to said shaft means for advancing the carriage toward the knife while simultaneously pivoting said jaws on said carriage against the workpiece in a direction to deflect the workpiece at the jaws away from the knife to present a convex length of said workpiece between the jaws to the knife during the cutting operation.

11. Apparatus for cutting an elongated workpiece of plastic material comprising a frame, a cutting knife on the frame, a carriage mounted pivotally on said frame for movement toward and away from said knife, workpiece supporting means on said carriage comprising an arm for engaging the side of the workpiece away from said knife and foot means extending from said arm toward the knife and arranged to engage the workpiece from below, said foot means being formed to straddle said knife, shaft means pivotally mounted on said carriage and extending transversely of said knife, workpiece gripping jaws keyed to but slidably mounted on said shaft means for adjustment toward and away from said workpiece supporting means, said jaws being disposed one at each side of said foot means on said arm and spaced substantially therefrom and being positioned to bear only against the side of the workpiece which is disposed toward the knife, spring means biasing said jaws resiliently to bear against said last-mentioned side of the workpiece in a direction away from the knife to thereby hold the workpiece against said workpiece supporting means, and carriage advancing means connected to said shaft means for advancing the carriage toward the knife while simultaneously pivoting said jaws on said carriage against the workpiece in a direction to deflect the workpiece at the jaws away from the knife to present a convex length of said workpiece between the jaws to the knife during the cutting operation.

12. Apparatus for cutting an elongated workpiece of plastic material comprising a frame, a cutting knife on the frame, a carriage mounted on said frame for movement toward and away from said knife, workpiece supporting means on said carriage comprising an arm for engaging the side of the workpiece away from said knife and foot means extending from said arm toward the knife and arranged to engage the workpiece from below, said foot means being formed to straddle said knife, shaft means pivotally mounted on said carriage to extend transversely of said knife, workpiece gripping jaws keyed to but slidably mounted on said shaft means for adjustment toward and away from said workpiece supporting means, said jaws having concave workpiece gripping faces, said jaws being disposed one at each side of said foot means on said arm and spaced substantially therefrom and being positioned to bear only against the side of the workpiece which is disposed toward the cutting knife, and carriage advancing means connected to said shaft means for advancing the carriage toward the knife while simultaneously pivoting said jaws against the workpiece in a direction to deflect the workpiece at the jaws away from the knife to present a convex length of said workpiece between the jaws to the knife during the cutting operation.

13. Apparatus for cutting an elongated workpiece of material comprising a frame, a cutting knife on the frame, a carriage mounted on said frame for movement toward and away from said knife, workpiece supporting means on said carriage comprising an arm for engaging the side of the workpiece away from said knife and foot means extending from said arm toward the knife and arranged to engage the workpiece from below, said arm being serrated adjacent said foot means to assist in preventing rotation of the workpiece being cut, a pair of workpiece gripping jaws on said carriage positioned to bear only against the side of the workpiece which is disposed toward the knife, said jaws being disposed one at each side of said foot means on said arm and spaced substantially therefrom, and carriage advancing means connected to said carriage and to said jaws for advancing the carriage toward the knife while simultaneously moving said jaws in a direction to deflect the workpiece at the jaws away from the knife to present a convex length of said workpiece between the jaws to the knife during the cutting operation.

14. Apparatus for cutting an elongated workpiece of material comprising a frame, a cutting knife on the frame, a carriage mounted on said frame for movement toward and away from said knife, workpiece supporting means on said carriage comprising an arm for engaging the side of the workpiece away from said knife and foot means extending from said arm toward the cutting knife and arranged to engage the workpiece from below, workpiece gripping jaws on said carriage mounted to bear only against the side of the workpiece which is disposed toward the knife, said jaws being disposed one at each side of said foot means on said arm and spaced substantially therefrom, carriage retraction spring means between said frame and carriage, and carriage advancing means connected to said carriage and to said jaws for advancing the carriage toward the knife while simultaneously moving said jaws against the workpiece in a direction to deflect the workpiece at the jaws away from the knife to present to the knife a convex length of said workpiece between the jaws during the cutting operation.

References Cited in the file of this patent

UNITED STATES PATENTS

| | | |
|---|---|---|
| 1,013,201 | Michel | Jan. 2, 1912 |
| 1,617,364 | Bacon | Feb. 15, 1927 |
| 2,003,364 | Irmscher | June 4, 1935 |
| 2,024,112 | Phillis | Dec. 10, 1935 |
| 2,293,721 | Engler | Aug. 25, 1942 |

FOREIGN PATENTS

| | | |
|---|---|---|
| 585,659 | France | Dec. 12, 1924 |
| 1,112,534 | France | Nov. 16, 1955 |